United States Patent
Nishimura

Patent Number: 5,663,935
Date of Patent: Sep. 2, 1997

[54] MAGNETO-OPTICAL RECORDING MEDIUM HAVING TWO MAGNETIC LAYERS OF EXCHANGE-COUPLED AT FERROMAGNETIC PHASE

[75] Inventor: Naoki Nishimura, Tokyo, Japan

[73] Assignee: Canon Kabushiki Kaisha, Tokyo, Japan

[21] Appl. No.: 597,270

[22] Filed: Feb. 6, 1996

[30] Foreign Application Priority Data

Feb. 8, 1995 [JP] Japan ................... 7-20035

[51] Int. Cl.$^6$ ................... G11B 11/00
[52] U.S. Cl. ................... 369/13; 428/694 ML; 428/694 SC
[58] Field of Search ................... 369/13, 14, 275.2, 369/275.5; 360/59, 114; 365/122; 428/694 ML, 694 MT, 694 MM, 694 EC, 694 SC

[56] References Cited

U.S. PATENT DOCUMENTS

| | | | |
|---|---|---|---|
| 5,216,663 | 6/1993 | Tsutsumi et al. | 369/275.2 |
| 5,265,073 | 11/1993 | Osato | 369/13 |
| 5,440,531 | 8/1995 | Sato et al. | 369/13 |
| 5,481,410 | 1/1996 | Osato et al. | 369/13 |
| 5,512,366 | 4/1996 | Nakaki et al. | 369/13 |

FOREIGN PATENT DOCUMENTS

| | | |
|---|---|---|
| 62-175948 | 8/1987 | Japan . |
| 63-316343 | 12/1988 | Japan . |
| 2-281442 | 11/1990 | Japan . |

*Primary Examiner*—Tan Dinh
*Attorney, Agent, or Firm*—Fitzpatrick, Cella, Harper & Scinto

[57] ABSTRACT

Binary recording is carried out with an optical recording medium having at least a recording layer, and an auxiliary layer which is in an antiferromagnetic phase at room temperature and which exhibits temperature hysteresis such that it changes upon elevation of temperature from the antiferromagnetic phase to a ferromagnetic phase at a temperature T1 higher than the room temperature but lower than the Curie temperature of the recording layer. Upon a drop in temperature from that state, it changes from the ferromagnetic phase into the antiferromagnetic phase at a temperature lower than T1 but higher than room temperature.

7 Claims, 3 Drawing Sheets

MAGNETO-OPTICAL RECORDING MEDIUM HAVING TWO MAGNETIC LAYERS OF EXCHANGE-COUPLED AT FERROMAGNETIC PHASE

BACKGROUND OF THE INVENTION

1. Field of the Invention

The present invention relates to a magneto-optical recording medium used for recording and reproduction of information with laser light, utilizing the magneto-optical effect, and particularly to a magneto-optical recording medium and a magneto-optical recording method enabling high-speed recording of information on a recording medium.

2. Related Background Art

The conventional recording method using a magneto-optical recording medium require three processes (erasure of old data, recording of new data, and verification of whether the new data was correctly recorded or not) upon recording. Thus, the conventional methods need three rotations of the disk in order to rewrite information, and require much time to rewrite the information.

To solve this problem overwriting methods were developed (the optical modulation method and magnetic modulation method), which exclude the erasing process from the three step process noted above and which record new data directly on old data. Using the magnetic modulation method, it is difficult to raise the recording speed, because it is impossible to increase recording capacity by cementing two disks to each other because the magnetic field is applied from the opposite side to the light incidence side and because there is a limit on the magnetic field modulation speed of the magnetic head.

In contrast, the optical modulation method is a method for forming magnetic domains as modulating laser light to record information. This method permits the medium to have a large capacity in a double-sided, cemented structure and makes it easy to enhance the recording speed because the switching speed of the optical laser is higher than the magnetic modulation speed of a magnetic head.

For example, Japanese Laid-open Patent Application No. 62-1175948 describes attempts to use a magneto-optical recording medium provided with a recording layer in a double-layered structure comprised of, for example, a recording layer of TbFe and an auxiliary layer of TbFeCo, and to realize overwriting by first performing initialization and thereafter applying an external magnetic field and irradiating the medium with laser bemas of different powers.

In this method, recording is carried out as follows: magnetization of the auxiliary layer is preliminarily aligned in one direction by an initialization magnetic field prior to recording, a low-power laser is emitted to transfer magnetic information in the auxiliary layer to the memory layer so as to erase the information in the memory layer, a high-power laser beam is emitted to raise the temperature of the medium to a temperature higher than the Curie temperature ($T_{c2}$) of the auxiliary layer, a recording magnetic field (opposite to the initialization magnetic field) is applied to invert the magnetization of the auxiliary layer, and the magnetization is transferred to the memory layer when the medium is cooled.

Further, Japanese Laid-open Patent Application No. 2-281442 discloses an attempt to use a magnetic phase transition material FeRh as an intermediate layer of an optical modulation overwriting medium to widen the laser power threshold range, thereby decreasing the initialization magnetic field. In this case, the FeRh intermediate layer is used in order to keep the magnetic interaction by electrostatic interaction between the recording layer and the auxiliary layer weak at room temperature but strong at a high temperature.

Further, Japanese Laid-open Patent Application No. 1-509020 discloses an attempt to perform optical modulation overwriting recording without the need to use the initialization magnetic field by providing the medium as described in above Japanese Laid-open Patent Application No. 62-175948 with an initialization layer.

However, the method of Japanese Laid-open Patent Application No. 62-175948 needs a strong initialization magnetic field in the double-layered structure of the magnetic layers as described above in order to invert the magnetization in the auxiliary layer at room temperature. Then, in order to decrease the necessary initialization magnetic filed to a practical level of strength, it is necessary to add the intermediate layer for decreasing the domain wall energy between the recording layer and the auxiliary layer, as described in Japanese Laid-open Patent Application No. 63-316343.

It is, however, necessary also in the case of the intermediate layer being added to apply a strong magnetic field of some kOe, which is also the case in the method as disclosed in Japanese Laid-open Patent Application No. 2-281442. This method needs an initialization magnetic field generator to be mounted in a magneto-optical recording apparatus, which makes reducing the size and cost of apparatus difficult.

Further, the method of Japanese Laid-open Patent Application No. 1-509020 practically needs five layers, an initialization layer, an auxiliary layer, a recording layer, an intermediate layer, and a switching layer, in order to perform stable recording and recording retention.

These methods thus need to use a recording medium in a thick structure as a whole, which needs some optical power upon recording. Then, the laser power becomes insufficient in recording at a high linear velocity, which disables recording.

The method of Japanese Laid-open Patent Application No. 1-509020, as described above, does not permit the so-called reflecting film structure, in which a reflecting film is provided to reflect incident light after transmission through the recording layer with efficiency and by which sufficient strength of the reproduction signal can be achieved also in the case of a magnetic body being arranged in a thin film, because the recording medium has the initialization layer.

SUMMARY OF THE INVENTION

In view of the above problems, an object of the present invention is to provide a medium which is composed of two magnetic layers, which can be made at a low cost, and which permits the reflecting film structure, and an optical modulation overwriting method which uses the medium, which can be carried out by a simple apparatus not necessitating the initialization magnetic field, and which permits higher-speed overwriting.

The above object can be achieved by a magneto-optical recording medium comprising:

a first magnetic layer, comprised of a perpendicular magnetization film, for stably retaining magnetic information at room temperature; and a second magnetic layer for reversibly changing between an antiferromagnetic phase and a ferromagnetic phase;

wherein the second magnetic layer is in the antiferromagnetic phase at room temperature and changes into the ferromagnetic phase at an elevated temperature, wherein a transition temperature T1 in a temperature-elevating process and a transition temperature T2 in a cooling process satisfy the relation of T1>T2, wherein the first magnetic layer and the second magnetic layer can be exchange-coupled with each other when the second magnetic layer is in the ferromagnetic phase, and the magnetization directions of the first magnetic layer and the second magnetic layer are antiparallel to each other when exchange-coupled.

Further, the above object can also be achieved by an overwriting method using a magneto-optical recording medium which comprises:

first magnetic layer, comprised of a perpendicular magnetization film, for stably retaining magnetic information at room temperature; and a second magnetic layer for reversibly changing between an antiferromagnetic phase and a ferromagnetic phase;

wherein the second magnetic layer is in the antiferromagnetic phase at room temperature and changes into the ferromagnetic phase at an elevated temperature, wherein a transition temperature T1 in a temperature-elevating process and a transition temperature T2 in a cooling process satisfy the relation of T1>T2, wherein the first magnetic layer and the second magnetic layer can be exchange-coupled with each other when the second magnetic layer is in the ferromagnetic phase, and the magnetization directions of the first magnetic layer and the second magnetic layer are antiparallel to each other when exchange-coupled, the overwriting method comprising:

selectively executing the following steps depending upon binary information to be recorded, a first recording step of raising the temperature with a light beam to a temperature higher than the room temperature but lower than the temperature T1 to orient the magnetization direction of the first magnetic layer to a direction of an external magnetic field; and a second recording step of raising the temperature with a light beam to a temperature higher than the temperature T1 to change the second magnetic layer into the ferromagnetic phase and to orient the magnetization direction of the second magnetic layer to the direction of the external magnetic field, and, in the cooling process thereafter, orienting the magnetization direction of the first magnetic layer to a direction stable with respect to the magnetization direction of the second magnetic layer by an exchange coupling force.

The details will be explained in the description of embodiments to follow.

DETAILED DESCRIPTION OF THE PREFERRED EMBODIMENTS

The magneto-optical recording medium and the overwriting method using the same medium according to the present invention will be explained in detail with reference to the drawings.

Figure 1:
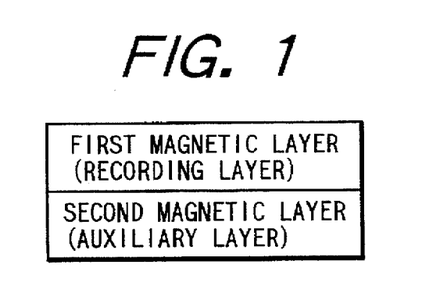
FIG. 1 is a diagrammatic sectional view showing the basic layer structure of magnetic layers in the magneto-optical recording medium of the present invention.

The magneto-optical recording medium of the present invention has at least a first magnetic layer, which is a perpendicular magnetization film, and a second magnetic layer, which is made of a magnetic phase transition material, in the stated order on an optically transparent substrate (FIG. 1). In the following description, the first magnetic layer will be called a recording layer and the second magnetic layer will be called an auxiliary layer.

The recording layer is a layer for storing recording information, which needs to be capable of stably retaining magnetic domains. A material for the recording layer may be selected from those having greater perpendicular magnetic anisotropy and being capable of stably retaining magnetic states, which may include rare earth-iron group amorphous alloys, for example such as TbFeCo, DyFeCo, TbDyFeCo; garnet; platinum group-iron group periodic structural films, for example such as Pt/Co and Pd/Co; platinum group-iron group alloys, for example such as PtCo and PdCo. By "iron group" is here meant the elements iron, cobalt, and nickel. By "platinum group" is here meant the elements Ru, Rh, Pd, Os, Ir, and Pt. The composition of the recording layer is preferably RE rich.

The auxiliary layer is made of a material which demonstrates a reversible magnetic phase transition such that it is antiferromagnetic at room temperature, it becomes ferromagnetic when heated from room temperature to a high temperature, and it returns to being antiferromagnetic when lowered to room temperature. This transition has temperature hysteresis.

More specifically, the material is antiferromagnetic at room temperature and changes from exhibiting antiferromagnetism to exhibiting ferromagnetism when heated from room temperature to an elevated temperature (the temperature where this transition takes place will be referred to as $T_1$). After that, it returns from exhibiting ferromagnetism to exhibiting antiferromagnetism at a temperature in the cooling process returning to the room temperature (the temperature where this transition takes place will be referred to as $T_2$). In this case, the relation of magnetization to temperature does not take the same path as the one in elevation of temperature, but the material returns from ferromagnetism to antiferromagnetism at a temperature lower than the transition temperature from antiferromagnetism to ferromagnetism during the elevation of temperature. Namely, the following relation stands.

Room temperature $(RT)<T_2<T_1$

The material for the auxiliary layer may be selected from magnetic films mainly containing, for example FeRh, MnSb, MnCrSb, HfTaFe, and/or MnPt. Among these, FeRh is most preferred in that magnetic films having magnetic phase transition temperatures higher than room temperature can easily be obtained therefrom. Further, an element such as P, Pt, or Ir may be added to FeRh for the purpose of controlling the magnetic phase transition temperatures or the like.

If the auxiliary layer were too thin, it would become inadequate to intercept the exchange force from the recording layer at room temperature; if the auxiliary layer were too thick, the laser power necessary for recording would become too high. Thus, the film thickness of the auxiliary layer is preferably between 100 Å and 800 Å, and more preferably between 150 Å and 600 Å.

The magnetic phase transition temperatures of the auxiliary layer are to be determined as follows:

120° C.$<T_1<$400° C., preferably 140° C.$<T_2<$280° C.;
100° C.$<T_2<$300° C., preferably 100° C.$<T_2<$200° C.;
20° C.$<T_1-T_2<$100° C., preferably 40° C.$<T_1-T_2<$80° C.

If the reflecting film structure is employed as forming a reflecting film on the auxiliary layer on the opposite side to the incidence side of the light, the film thicknesses of the magnetic layers should be determined as small as possible within the range while not losing the original functions. In this case, the film thicknesses of the recording layer and the auxiliary layer are determined each to be not more than 300 Å, and preferably to be 200 Å.

An element for improving corrosion resistance, such as Al, Ti, Pt, Nb, or Cr, may be added to the recording layer or the auxiliary layer. In addition to the above recording layer and auxiliary layer, a layer of a dielectric such as SiNx, AlOx, TaOx, or SiOx may be formed in order to enhance the interference effect or for performance protection. Also, a layer with good thermal conduction such as Al, AlTa, AlTi, AlCr, or Cu may be added in order to improve thermal conduction. Another additional layer may be an initialization layer, in which magnetization is aligned in one direction in order to perform optical modulation overwriting, or an auxiliary layer for controlling the exchange coupling force or the magnetostatic coupling force in order to aid in recording or reproduction. Further, a protective coating comprised of the above dielectric layer or a polymeric resin may be added as a protection layer.

Since the medium of the present invention can take the reflecting film structure, a reflecting layer may be provided on the side opposite to the light incidence side of the magnetic layers by forming the magnetic layers thin enough for light to be transmitted therethrough. A material for this reflecting layer may be selected preferably from materials with high reflectivity, such as Al, AlTa, AlTi, AlCr, Pt, and PtCo. Among these, the materials mainly containing Al are preferred because they have high reflectivities and are inexpensive. The auxiliary layer can be exchange-coupled strongly with the recording layer when it is in the ferromagnetic phase.

The overwriting process of the present invention is explained below.

The recording method of the magneto-optical recording medium according to the present invention is an optical modulation overwriting method for modulating the intensity of laser light, depending upon data signals, and applying an external magnetic field. The overwriting method is explained below in detail.

Figure 2:
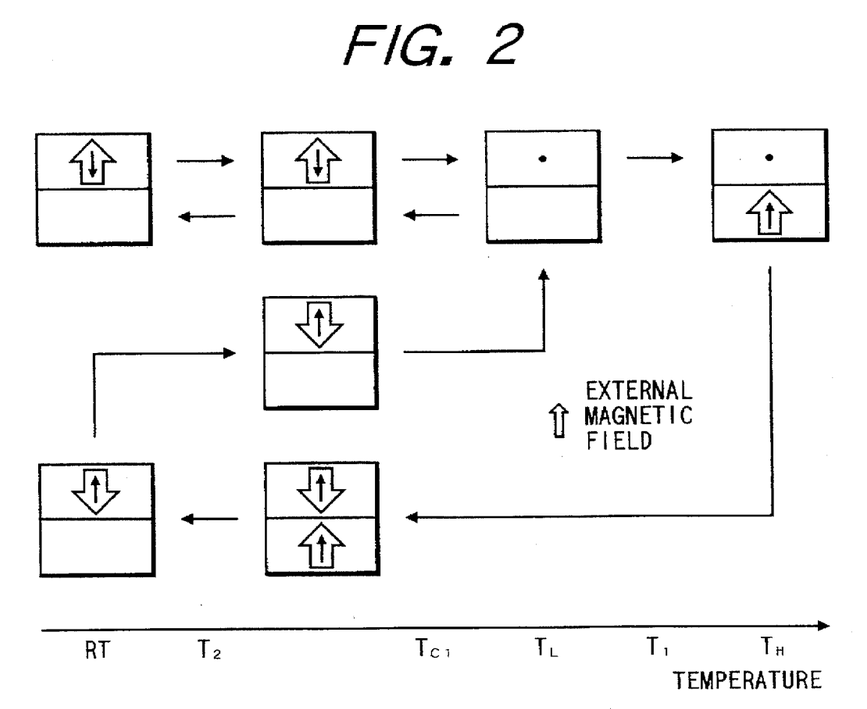
FIG. 2 is a drawing showing the magnetic states of the recording layer and the auxiliary layer upon recording of the magneto-optical recording medium of the present invention.

FIG. 2 shows changes in the magnetic states of the magnetic layers upon optical modulation overwriting. In the drawing, blank arrows represent the directions of the entire magnetization (hereinafter referred to simply as magnetization) while black arrows represent the directions of sub-lattice magnetization with a strong exchange force.

As shown in FIG. 2, magnetization in the recording layer is directed upward or downward depending upon information at room temperature, thus storing binary data. Next explained are the cases where upward or downward data is overwritten in each state as applying the external magnetic field in one direction (which is upward in the description) and modulating the laser light.

(1) Suppose information is already recorded in a state of upward magnetization in the recording layer. When an upward magnetization state is again overwritten over this state, laser light with low power ($P_L$) is emitted to raise the temperature of the medium to $T_L$. This temperature $T_L$ is a temperature higher than the room temperature but lower than the temperature $T_1$ where the auxiliary layer enters the ferromagnetic phase. As shown in FIG. 2, after the temperature is raised to the temperature higher than the room temperature but lower than $T_1$, the auxiliary layer is maintained in the antiferromagnetic state, and the recording layer is affected only by the external magnetic field to direct its magnetization in the direction of the external magnetic field. Thus, upward magnetization is again recorded in the recording layer in the cooling process and is retained therein.

Figure 3:
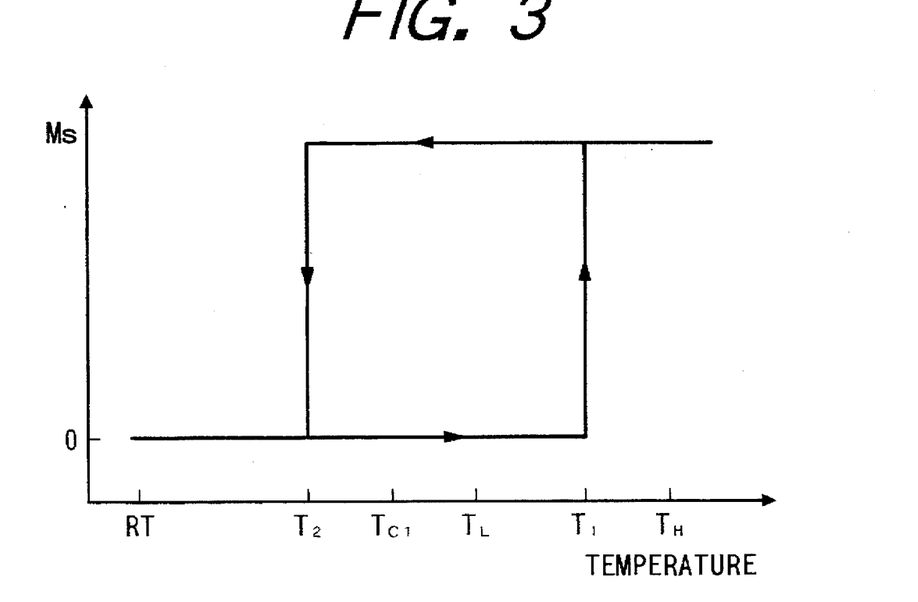
FIG. 3 is a graph showing temperature hysteresis of magnetization in the auxiliary layer used in the present invention.

(2) Suppose information is already recorded in a state of upward magnetization in the recording layer. For overwriting a state of downward magnetization over this state, laser light with low power ($P_H$) is emitted to increase the temperature of the medium to $T_H$. This temperature $T_H$ is set so as to be higher than the temperature $T_1$ as described above, where the auxiliary layer enters the ferromagnetic phase. Under irradiation with the laser light of power $P_H$, the auxiliary layer enters the ferromagnetic phase to be aligned with the direction of the external magnetic field, and the recording layer is subject to the exchange force from the auxiliary layer. Since this exchange force has a stronger effect than the external magnetic field, the recording layer is exchange-coupled with the auxiliary layer and the magnetization thereof is directed in the opposite direction to the external magnetic field. Since the auxiliary layer has the temperature hysteresis as shown in FIG. 3, it keeps the magnetization even at the medium temperature $T_L$, which is the temperature when laser light of a low power irradiates the medium, in the cooling process. Because of this the magnetization of the recording layer is kept from being aligned with the direction of the external magnetic field under application thereof in the cooling process. Accordingly, downward magnetization is recorded and retained in the recording layer. The compositions of the recording layer and the auxiliary layer are determined so as to have mutually different rich components so that overall magnetization directions thereof may become antiparallel when the recording layer is exchange-coupled with the auxiliary layer. For example, the recording layer is RE rich and the auxiliary layer is TM rich.

(3) Suppose information is already recorded in a state of downward magnetization in the recording layer. When an upward magnetization state is overwritten over this state, laser light of a low power $P_L$ is emitted in the same manner as in the case of (1) to raise the medium temperature to $T_L$. Similarly as in (1), the magnetization is directed in the direction of the external magnetic field, so that the upward magnetization is recorded and retained in the recording layer.

(4) Suppose information is already recorded in a state of downward magnetization in the recording layer. When a downward magnetization state is overwritten over this state, laser light of a high power $P_H$ is emitted in the same manner as in the case of (2) to raise the medium temperature to $T_H$. Similarly as in (2), the auxiliary layer enters the ferromagnetic phase to be aligned with the direction of the external magnetic field, and the recording layer is subject to the exchange force from the auxiliary layer, whereby the magnetization of the recording layer is directed in the opposite direction to the external magnetic filed. The magnetization is kept from being inverted in the cooling process, so that the downward magnetization is recorded and retained in the recording layer. In order to satisfy these conditions, the Curie temperature $T_{c1}$ of the first magnetic layer needs to satisfy at least the condition of the following equation.

$$RT<T_2<T_{c1}, \text{ preferably } RT<T_2<T_{c1}<T_1$$

The recording method of optical modulation overwriting was described above. The external magnetic field applied in the recording is set so as to be greater than the coercive force of the recording layer when irradiated with the $P_L$ light (the condition for which is expressed by Equation (a) below), and is set so as to be weak enough to keep the magnetization of the recording layer from being directed in the direction of the external magnetic field when irradiated with the $P_H$ light (the condition for which is expressed by Equation (b) below).

With irradiation of the $P_H$ light, it is inversely necessary to prevent the magnetization in the auxiliary layer from being directed in the opposite direction to the external magnetic field by the interfacial domain wall to the magnetization in the recording layer (the condition for which is expressed by Equation (c) below).

$$M_{s1} \cdot H_{c1} < M_{s1} \cdot H_b \quad (a)$$

$$M_{s1} \cdot H_{c1} < \sigma w/(2h_1) - M_{s1} \cdot H_s \quad (b)$$

$$M_{s2} \cdot H_{c2} < M_{s2} \cdot H_b - \sigma w/(2h_2) \quad (c)$$

In Equations (a), (b), and (c), $M_{s1}$ and $M_{s2}$ represent saturation magnetizations of the recording layer and the auxiliary layer, $h_1$ and $h_2$ represent the film thicknesses thereof, $H_{c1}$ and $H_{c2}$ represent the coercivity thereof, $\sigma w$ denotes the energy of the interface magnetic wall between the recording layer and the auxiliary layer, and $H_b$ denotes the external magnetic field.

The method of reproduction is next described.

Figure 5:
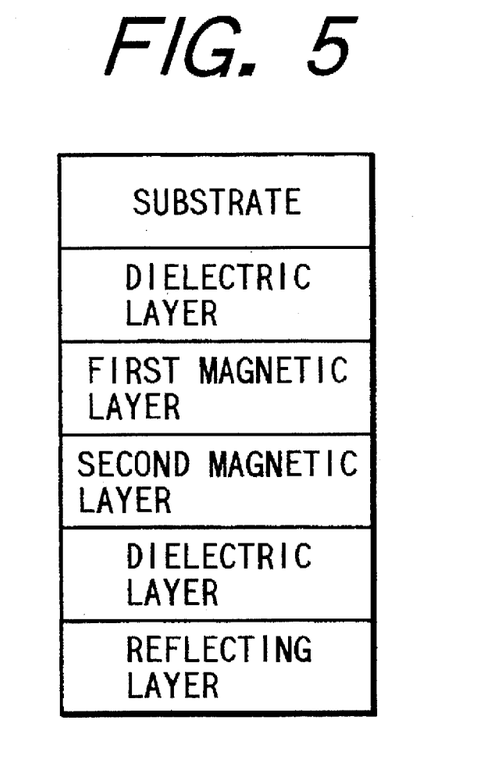
FIG. 5 is a diagrammatic sectional view showing an example of a layer structure of the magneto-optical recording medium of the present invention.

The power emitted upon reproduction is set so as to be lower than the low power $P_L$ upon recording, thereby being set so as not to destroy the magnetic information in the recording layer. Since the auxiliary layer is kept in the antiferromagnetic phase upon reproduction, the magnetic information is not detected from the auxiliary layer. Thus, no trouble will be caused by penetration of incident light into the auxiliary layer upon reproduction. Accordingly, the reflecting film structure may be employed by forming the reflecting layer on the opposite side to the incident side of light of the magnetic layers, as shown in FIG. 5. This permits a decrease in the film thickness of the recording layer and improves the SN ratio because of the enhancing effect of the reflecting structure. This point is a characteristic peculiar to the medium of the present invention, which is not seen in conventional media.

The present invention will be explained in further detail with experimental examples, but it should be noted that the present invention is by no means limited to the following examples within the scope not departing from the spirit of the invention.

EXAMPLE 1

In order to check the magnetic characteristics of FeRh, a film of FeRh was formed on a glass substrate using a dc magnetron sputtering apparatus. The composition of FeRh was determined as Fe: Rh=47:53 by atomic ratio by controlling powers to targets of Fe and Rh. The film thickness was 2000 Å. After the film formation of FeRh, a film of SiN was formed in 800 Å as a protection film. Upon the film formation the substrate was heated so as to facilitate crystallization of FeRh.

Figure 4:
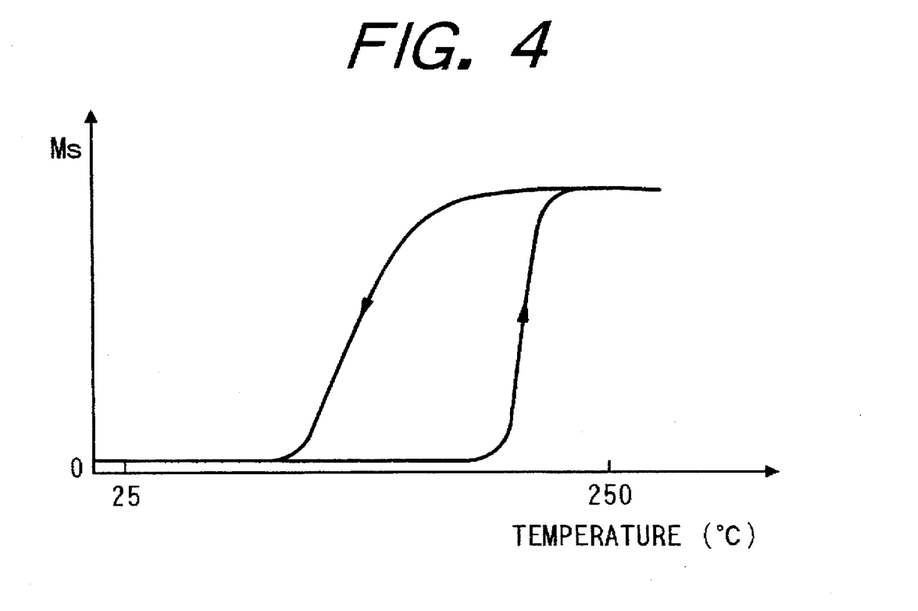
FIG. 4 is a graph showing temperature hysteresis of magnetization in the FeRh thin film of Embodiment 1.

While the external magnetic field was applied to the FeRh sample, the magnetization thereof was measured using a vibrating-sample type magnetometer. The sample was evacuated upon measurement to a vacuum of $1 \times 10^{-3}$ Pa by a rotary pump, and the temperature of the sample was raised from the room temperature to 300° C. FIG. 4 shows a change of magnetization during this measurement. The measurement of magnetization was carried out while applying the external magnetic field of about 5 kOe. The arrows on the lines of FIG. 4 represent the directions of temperature rise and temperature drop. As shown in FIG. 4, this FeRh sample was not magnetized at room temperature, but shows the magnetic phase transition from antiferromagnetism to ferromagnetism during the temperature rise from room temperature and again changed from ferromagnetism to antiferromagnetism at a lower temperature during the temperature drop than the transition temperature during the temperature rise. Thus, this FeRh thin film shows a temperature hysteresis of magnetization suitable for the auxiliary layer in the medium of the present invention.

When Ir was added to FeRh at a rate of 5 to 10% to Rh, the transition temperatures increased about 170° C. to 280° C. as compared to the transition temperature without the addition of Ir. Similarly, when Pd was added at a rate of 2 to 6% to Rh, the transition temperatures decreased about 50° C. to 150° C. as compared with the transition temperatures without the addition of Pd. When the Rh content of FeRh was changed in the range of 48 to 62%, the magnetic transition temperatures increased with an increase of the rate of Rh. An appropriate range of the Rh content in FeRh is between 50 and 60%, in order to avoid the occurrence of a magnetic phase transition during reproduction.

EXAMPLE 2

The magneto-optical recording medium of the present invention was fabricated in the following manner.

First, targets of Si, Gd, Tb, Fe, Co, and Rh were mounted in a dc magnetron sputtering apparatus, a pregrooved glass substrate of a diameter 130 mm was fixed to a substrate holder located at a distance of 150 mm to the targets, and thereafter the chamber was evacuated by a cryo-pump to a high vacuum of below $1 \times 10^{-5}$ Pa. During continuing evacuation to the vacuum, Ar gas was introduced into the chamber up to 0.4 Pa. Then an interference layer of SiN was formed at a thickness of 900 Å, a recording layer of TbFeCo was formed at a thickness of 400 Å, an auxiliary layer of FeRh was formed at a thickness of 400 Å, and a protection layer of SiN was formed at a thickness of 700 Å in the stated order on the substrate, thus obtaining the magneto-optical recording medium of the present invention. Upon the film formation of FeRh, the substrate was heated so as to facilitate crystallization. Upon the film formation of each SiN dielectric layer, $N_2$ gas was introduced in addition to the Ar gas, and the film was formed by reactive sputtering by controlling a mixture ratio of the gases so as to achieve a refractive index of 2.1.

The composition of the TbFeCo recording layer was Tb 23 (Fe 78 Co 22) 77, which was RE rich at room temperature and which had an $M_s$ of 120 emu/cc and a Curie temperature of 220° C.

The composition of FeRh was Fe 42 Rh 58.

Overwrite-recording characteristics were next measured using this magneto-optical recording medium. The measurement was carried out under the following conditions: the N.A. of an objective lens was 0.55; the laser wavelength was 780 nm; the recording power was 7 to 13 mW; the reproducing power was set so as to maximize the C/N ratio within the range of 1.5 to 2.0 mW. The linear velocity was 9 m/s.

After a magnetic field of 500 Oe was applied in the erasing direction prior to the measurement, a signal of 7.5 MHz was recorded having a mark length of 0.60 μm by the recording power 13 mW by applying the magnetic field of 500 Oe in the recording direction. After the recording, setting the power of the $P_L$ light to 7 to 8 mW and the power of the $P_H$ light to 10 to 13 mW, a signal of 5.8 MHz was overwritten by optical modulation having a mark length of 0.78 μm by applying a magnetic field of 300 Oe. After the recording, the medium was irradiated with a laser light of the reproducing power, C/N ratios were measured for the new signal of 5.8 MHz and the old signal of 7.5 MHz. Next reversing the order, a signal of 5.8 MHz was recorded first and then a new signal of 7.5 MHz was overwritten in the same manner. Then the new signal and old signal were reproduced to measure C/N ratios in the same manner as above. The results are shown in Table 1.

EXAMPLE 3

Formed on the same substrate with the same film-forming apparatus and in the same layer structure as in Example 1 were an SiN interference layer having a thickness of 900 Å, a TbFeCo recording layer of a thickness of 200 Å, an FeRhIr auxiliary layer of a thickness of 100 Å, an SiN protection (interference) layer of a thickness of 300 Å, and an Al reflecting layer of a thickness of 600 Å in the stated order, thus obtaining the magneto-optical recording medium of the present invention as shown in FIG. 5.

The composition of the TbFeCo recording layer was Tb 23 (Fe 78 Co 22) 77, which was RE rich at room temperature and which had an $M_s$ of 120 emu/cc and a Curie temperature of 220° C. The composition of the FeRhIr auxiliary layer was Fe 47 (Rf 95 Ir 5) 53, which had the magnetic phase transition temperature of about 150° C. in elevation of temperature.

The same overwriting tests as in Example 2 were next carried out using this magneto-optical recording medium. The results are shown in Table 1.

COMPARATIVE EXAMPLE 1

For comparison, a conventional magneto-optical recording medium having the two magnetic layers, similar to the medium of the present invention, was also fabricated and evaluated.

Formed on the same glass substrate using the same film-forming apparatus and film-forming method as in Example 2 were an SiN interference layer of a thickness of 900 Å, a GdTbFeCo reproduction and recording layer of a thickness of 400 Å, a TbFeCo auxiliary layer of a thickness of 400 Å, and an SiN protection layer of a thickness of 700Å in the stated order, thus forming a magneto-optical recording medium.

The composition of the GdTbFeCo recording layer was set so as to be TMrich at room temperature and to have an $M_s$ of −180 emu/cc and a Curie temperature of 200° C.

The composition of the TbFeCo memory layer was set so as to be Tm rich at room temperature and to have an $M_s$ of 150 emu/cc and a Curie temperature of 250° C.

Then the recording and reproducing characteristics were measured for this magneto-optical recording medium in the same manner as in Example 2. During the measurement, an additional measurement was carried out in the same manner for the cases where the initialization magnetic field was applied before recording. Results are shown in Table 1.

The results shown in Table 1 confirmed that it was difficult to realize the optical modulation overwriting in the medium of the comparative example without the application of a sufficient initialization magnetic field, whereas good optical modulation overwriting could be realized in the magneto-optical recording media of the present invention even in the simple medium structure composed of the two magnetic layers and without using the initialization magnetic field and it was also possible for the medium of the invention to take the reflecting film structure.

TABLE 1

| | Recording Frequency of New Signal (MHz) | | | | |
|---|---|---|---|---|---|
| | 7.5 | 7.5 | 5.8 | 5.8 | Initial- |
| | Reproduction Signal (dB) | | | | ization |
| | New Signal C/N | Old Signal C/N | New Signal C/N | Old Signal C/N | Magnetic Field (kOe) |
| Ex 2 | 44 | 4 | 45 | 7 | 0 |
| Ex 3 | 45 | 6 | 46 | 6 | 0 |
| Comp. Ex 1 | 21 | 20 | 21 | 18 | 0 |
| Comp. Ex 1 | 34 | 23 | 36 | 20 | 5 |
| Comp. Ex 1 | 40 | 15 | 42 | 23 | 15 |

As explained above, high-speed optical modulation overwriting can be realized using the magneto-optical recording medium and overwriting method according to the present invention, with use of a simple apparatus (conventional apparatus) not necessitating the initializing magnet and the low-cost medium theoretically composed of the two magnetic layers and being capable of also taking the reflecting-film structure.

What is claimed is:

1. A magneto-optical recording medium comprising:
   a first magnetic layer, comprised of a perpendicular magnetization film, for stably retaining magnetic information at room temperature; and
   a second magnetic layer for reversibly changing between an antiferromagnetic phase and a ferromagnetic phase;
   wherein said second magnetic layer is in the antiferromagnetic phase at room temperature and changes into the ferromagnetic phase at an elevated temperature, wherein a transition temperature T1 in a temperature-elevating process and a transition temperature T2 in a cooling process satisfy the relation of T1>T2, wherein said first magnetic layer and said second magnetic layer are exchange-coupled with each other when said second magnetic layer is in the ferromagnetic phase, and wherein the magnetization directions of said first magnetic layer and said second magnetic layer are antiparallel to each other when exchange-coupled.

2. The magneto-optical recording medium according to claim 1, wherein said first magnetic layer is a rare earth-transition metal amorphous alloy.

3. The magneto-optical recording medium according to claim 1, wherein said second magnetic layer mainly contains FeRh.

4. The magneto-optical recording medium according to claim 1, further comprising an optically transparent substrate, wherein said first magnetic layer and said second magnetic layer are laminated in this order on said substrate.

5. The magneto-optical recording medium according to claim 4, wherein a reflecting layer is provided on an opposite side of said second magnetic layer to said first magnetic layer.

6. The magneto-optical recording medium according to claim 1, wherein when a Curie temperature of said first magnetic layer is Tc1, said medium satisfies the following condition:

T2<Tc1<T1.

7. An overwriting method using a magneto-optical recording medium which comprises a first magnetic layer, comprised of a perpendicular magnetization film, for stably retaining magnetic information at room temperature, and a second magnetic layer for reversibly changing between an antiferromagnetic phase and a ferromagnetic phase, wherein the second magnetic layer is in the antiferromagnetic phase at room temperature and changes into the ferromagnetic phase at an elevated temperature, wherein a transition temperature T1 in a temperature-elevating process and a transition temperature T2 in a cooling process satisfy the relation of T1>T2, wherein the first magnetic layer and the second magnetic layer are exchange-coupled with each other when the second magnetic layer is in the ferromagnetic phase, and wherein the magnetization directions of the first magnetic layer and the second magnetic layer are antiparallel to each other when exchange-coupled, said overwriting method comprising selectively executing the following steps depending upon binary information to be recorded:

a first recording step of raising the temperature of the medium with a light beam to a temperature higher than the room temperature but lower than temperature T1 to orient the magnetization direction of the first magnetic layer to a direction of an external magnetic field; and a second recording step of raising the temperature of the medium with a light beam to a temperature higher than temperature T1 to change the second magnetic layer into the ferromagnetic phase and to orient the magnetization direction of the second magnetic layer to the direction of the external magnetic field, and, in the cooling process, orienting the magnetization direction of the first magnetic layer to a direction stable with respect to the magnetization direction of the second magnetic layer by an exchange coupling force.

* * * * *

UNITED STATES PATENT AND TRADEMARK OFFICE
CERTIFICATE OF CORRECTION

PATENT NO. : 5,663,935          Page 1 of 2
DATED      : September 2, 1997
INVENTOR(S): NAOKI NISHIMURA It is certified that error appears in the above-indentified patent and that said Letters Patent is hereby corrected as shown below:

Title page,

TITLE

Item [54]

delete "OF".

COLUMN 1

Line 3, delete "OF".
     Line 16, "method" should read --methods--.
     Line 42, "62-1175948" should read
--62-175948--.
     Line 48, "bemas" should read --beams--.
     Line 52, "laser" should read --laser beam--.

COLUMN 2

Line 18, "filed" should read --field--.

COLUMN 3

Line 15, "first" should read --a first--.

UNITED STATES PATENT AND TRADEMARK OFFICE
CERTIFICATE OF CORRECTION

PATENT NO. : 5,663,935
DATED : September 2, 1997
INVENTOR(S) : NAOKI NISHIMURA

It is certified that error appears in the above-indentified patent and that said Letters Patent is hereby corrected as shown below:

COLUMN 4

Line 57, "(RT)<$T_2$<T1" should read --(RT)<$T_2$<$T_1$--.

COLUMN 6

Line 66, "filed" should read --field--.

COLUMN 7

Line 26 should read
--$M_{s1}:H_{C1}<\sigma w/(2h_1)-M_{s1}.H_b$          (b)--.

COLUMN 9

Line 61, "TMrich" should read --TM rich--.
Line 64, "Tm rich" should read -- TM rich--.

Signed and Sealed this

Seventh Day of April, 1998

Attest:

BRUCE LEHMAN

*Attesting Officer*            *Commissioner of Patents and Trademarks*